United States Patent [19]

Kane

[11] Patent Number: 4,723,335
[45] Date of Patent: Feb. 9, 1988

[54] WHEEL BORE CLEANER

[75] Inventor: John P. Kane, Sterling Heights, Mich.

[73] Assignee: Allied Automation Systems, Inc., Detroit, Mich.

[21] Appl. No.: 890,380

[22] Filed: Jul. 29, 1986

[51] Int. Cl.[4] ............................................. B23D 79/02
[52] U.S. Cl. ..................................... 15/93 R; 29/81 J
[58] Field of Search ............ 134/144; 15/21 R, 93 R; 29/81 F, 81 G, 81 H, 81 J, , 159.1

[56] References Cited

U.S. PATENT DOCUMENTS

| | | | |
|---|---|---|---|
| 1,941,915 | 1/1934 | Rosenberger | 134/144 X |
| 2,832,085 | 4/1958 | Chamberlain | 15/21 R |
| 2,915,766 | 12/1959 | Peterson | 15/21 R |
| 2,986,849 | 6/1961 | Clark | 15/21 R |
| 3,017,891 | 1/1962 | Tomchak | 134/144 X |
| 3,108,299 | 10/1963 | Baldwin | 15/21 R |
| 4,025,981 | 5/1977 | Root et al. | 15/21 R |
| 4,563,975 | 1/1986 | Kozlowski et al. | 118/320 |

Primary Examiner—Stuart S. Levy
Assistant Examiner—Steven M. du Bois
Attorney, Agent, or Firm—Basile and Hanlon

[57] ABSTRACT

Apparatus for cleaning the central opening or bore of a vehicle wheel and an adjacent annular radial surface includes a power driven shaft mounted for rotation about and axial movement along a fixed vertical axis. A cleaning head includes a horizontal plate axially slidable upon and rotatively fixed to the upper end of the shaft. A horizontal cleaning disc is mounted upon the plate by a pair of parallel links, one of which is pivotally coupled to the upper end of the shaft to cause the disc to shift horizontally relative to the plate upon vertical movement of the disc relative to the plate and shaft. Upon upward movement of the disc into engagement with a downwardly facing radial surface of a wheel centered over the shaft in a horizontal position, further upward movement of the shaft will shift the disc horizontally until a vertical cleaning surface on the disc engages the bore of the wheel. Rotation of the cleaning head will clean the wheel surfaces of the wheel engaged by the disc and vertical surface.

The linkage arrangement enables the head to self adjust to wheels of different dimensions and cross-sectional configuration which may be fed in random sequence into the apparatus.

4 Claims, 5 Drawing Figures

WHEEL BORE CLEANER

BACKGROUND OF THE INVENTION

The present invention is directed to an apparatus for preparing, on a mass production basis, vehicle wheels for a dynamic balancing operation. The dynamic balancers support the wheel adjacent its central opening or bore upon a horizontal platform from which an expandible collet projects upwardly through the wheel bore to clamp the wheel for rotation during the balancing operation. For optimum results of the balancing operation, it is essential that the wheel be chucked by the collet in the balancer with the wheel axis precisely coaxial to the axis of rotation of the balancer. Irregularities in the surfaces of the wheel engaged with the balancer, such as weld splatter, paint lumps and dirt particles can interfere with the achievement of the desired coaxial relationship between the wheel and balancer, and can also be knocked loose from the wheel during the chucking operation and get into the collet of the balancer to the point where frequent disassembly and cleaning of the collet is required.

The present invention is designed to "clean" the wheel surfaces which will be engaged by the balancer prior to the balancing operation. The "cleaning" operation performed by the apparatus to be described below might more accurately be characterized as a scraping operation. However, the operation is not intended to remove any metal of the wheel and, if possible, not to remove any more paint than is necessary to achieve flat or truly cylindrical surfaces for presentation to the balancer.

The apparatus, because of the random mix of wheels required by the production line, is also operable to self adjust itself to wheels of different dimensions.

SUMMARY OF THE INVENTION

In an apparatus embodying the present invention, wheels to be cleaned are advanced in a horizontal position in succession along a horizontal run of a pair of transversely spaced parallel conveying chains to a work station at which the cleaning operation is performed. Upon the arrival of a wheel at the work station, the conveyor is stopped. A centering device is then moved into engagement with the uppermost wheel rim to accurately locate the center of the wheel in coaxial relationship with a vertical shaft which can be driven in rotation and raised and lowered axially relative to the frame of the apparatus to and from a normally maintained lowered rest position. A cleaning head is mounted on the upper end of the shaft and includes a pair of horizontally disposed upper and lower plates which are coupled to each other by a pair of parallel links whose opposite ends are connected to the respective plates by pivotal connections having parallel horizontal pivot axes. The lower plate is slidably mounted upon the upper end portion of the vertical shaft for vertical movement relative to the shaft to and from an upper end limit of movement relative to the shaft. A compression spring resiliently biases the lower plate to its upper end limit of movement relative to the shaft. The lower plate is keyed or otherwise rotatively locked to the vertical shaft. A rigid crank arm is formed on the lower end of one of the parallel links and is coupled to the upper end of the shaft so that relative vertical movement between the lower plate and the shaft will drive the links in pivotal movement to cause the upper plate to move both horizontally and vertically relative to the lower plate, along a path constrained by the parallel links. The geometry of the linkage is such that when the lower plate is at its upper end limit of movement relative to the shaft, the vertical spacing between the plates is maximum.

The upper plate is in the form of a circular disc and its top surface is formed with radially extending grooves and with a cutter block projecting vertically upwardly from the top surface of the disc to present a radially outwardly facing knurled surface.

When a wheel is positioned on the conveyor by the centering mechanism, in coaxial relationship with the vertical shaft, the shaft is elevated, carrying the cleaning head upwardly with the shaft, and the shaft is driven in rotation. The head will move upwardly until the upper disc engages the underside of the wheel around the central opening or bore through the wheel, the cutter block being so located so as to pass upwardly through the bore of the wheel at this time.

Continued upper movement of the shaft presses the upper disc against the bottom of the wheel and when the force of the compression spring biasing the lower disc to its upper end limit of movement relative to the shaft is overcome, the shaft will start to move upwardly relative to the lower plate. This upward movement is transmitted through the crank to the linkage which causes the links to pivot in a direction in which the upper disc is moved radially outwardly relative to the shaft axis until the knurled surface which projects upwardly from the upper disc moves into engagement with the bore in the wheel. The rotating lower plate transmits its rotation via the linkage to the upper disc and the top of the upper disc and knurled surface on the upper disc will scrape the engaged surfaces of the wheel to perform the cleaning operation.

Upon subsequent lowering of the vertical shaft, the upper disc returns to its original relationship with the lower plate as the spring restores the linkage to its original condition and the cleaning head is retracted below the path of movement of the wheel along the conveyor. When the shaft is fully retracted, the conveyor is started up again to convey the cleaned wheel out of the work station and to convey the next following wheel into position for cleaning.

Other objects and features of the invention will become apparent by reference to the following specification and to the drawings.

IN THE DRAWINGS

Figure 1:
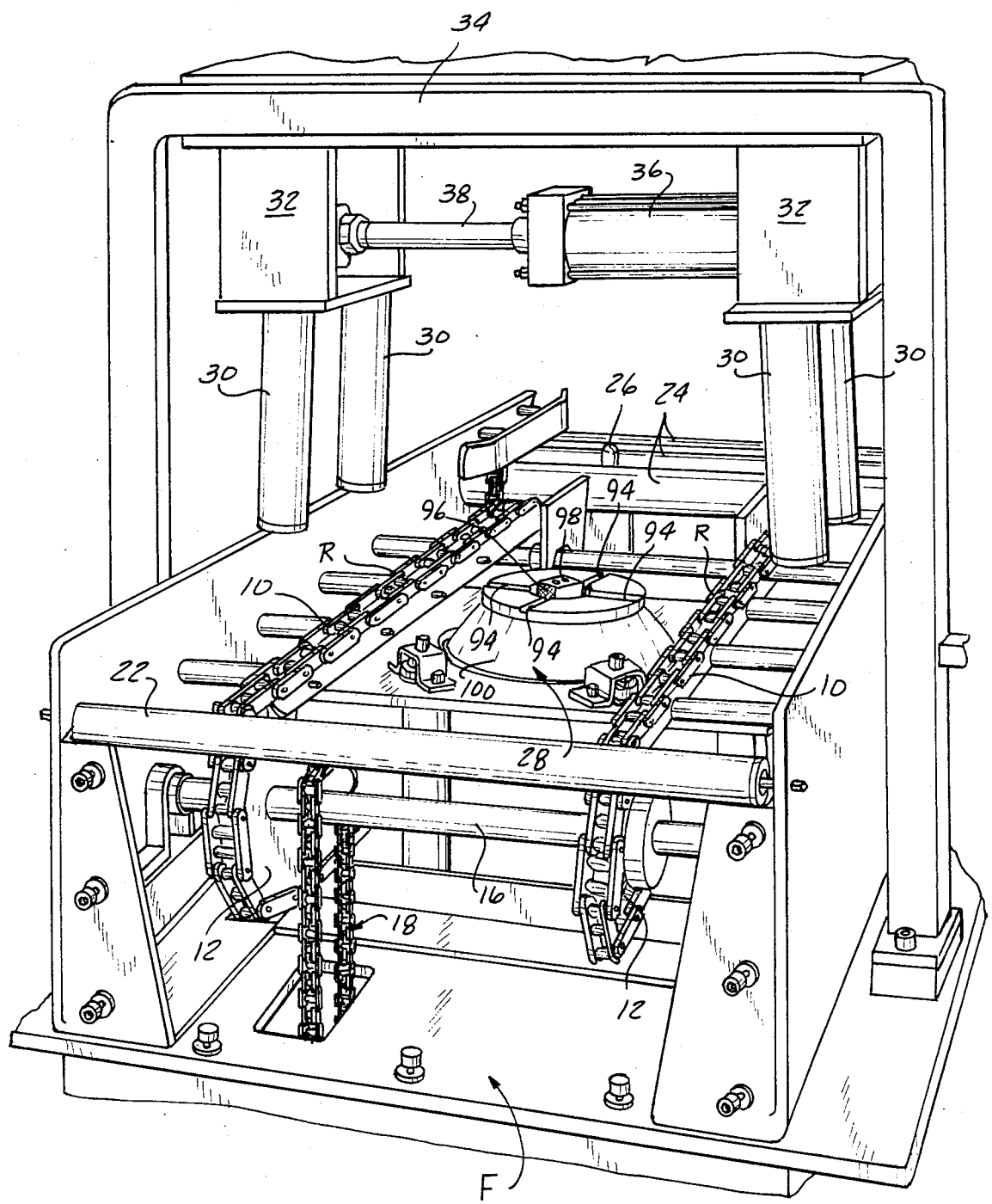
FIG. 1 is a perspective view of a wheel bore cleaner embodying the present invention looking into the discharge end of the machine.
Figure 2:
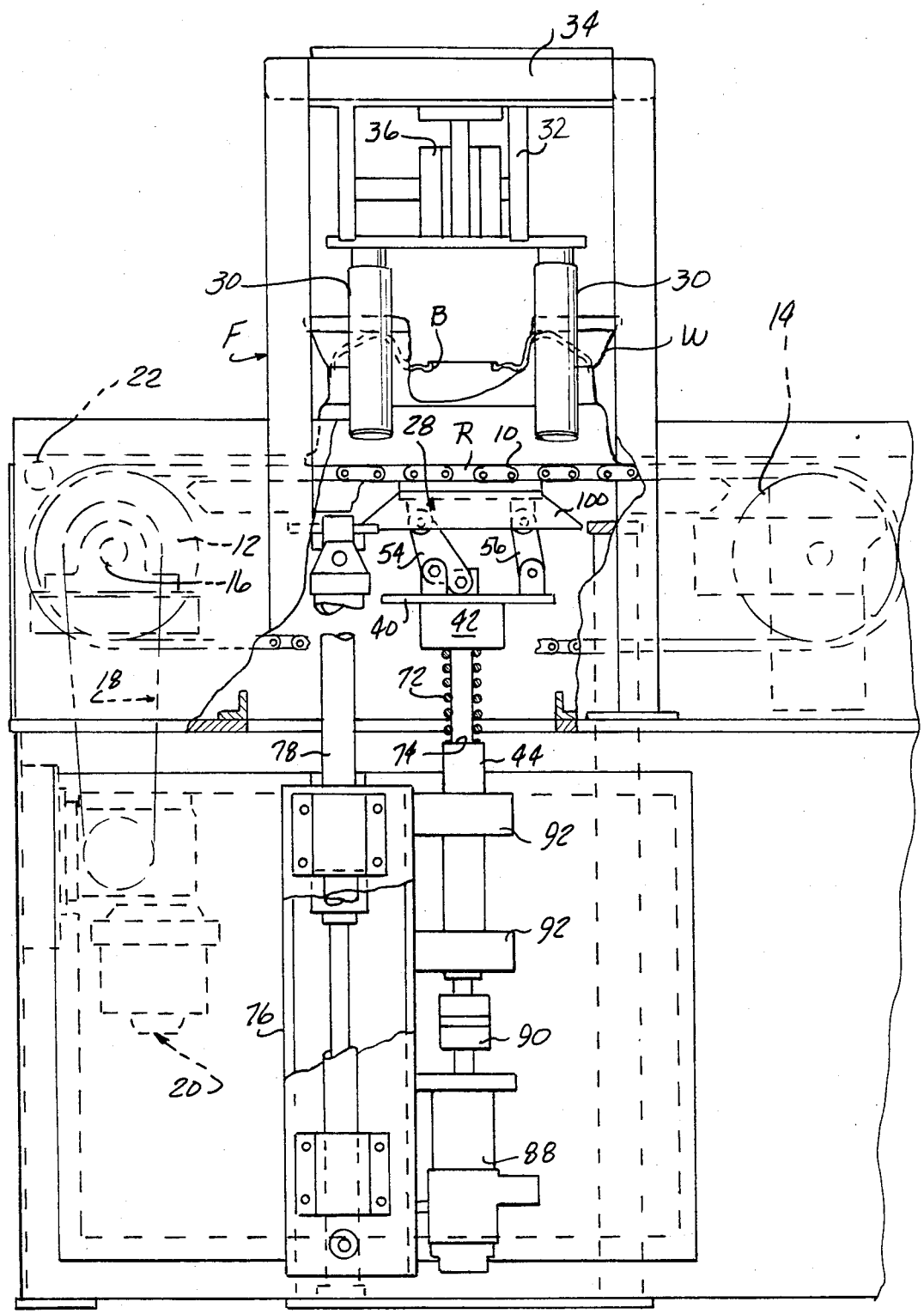
FIG. 2 is a partial side elevational view of the machine of FIG. 1, with certain parts broken away, omitted, or shown in cross-section.

The overall arrangement of the wheel bore cleaner is best seen in FIGS. 1 and 2. The machine includes a frame designated generally F mounting an endless conveyor including a spaced pair of endless chains 10 operatively trained about first and second pairs of end sprockets 12 an 14 respectively for movement along an endless path which includes a horizontal upper run R. End sprockets 12 are fixedly mounted upon a common shaft 16 rotatably journalled in the frame F and shaft 16 is in turn driven in rotation by a chain and sprocket drive designated generally 18 which is in turn driven by a rotary air motor-gear reduction unit designated generally 20 (FIG. 2) mounted upon the machine frame. The chains 10 are driven in a direction such that their horizontal upper run R moves toward the observer as viewed in FIG. 1 and from right to left as viewed in FIG. 2.

A discharge roller 22 is mounted in frame F at the discharge end of upper run R of the chains for free rotation, while at the opposite end of upper run R a series of power driven rollers 24 are mounted on the frame F to feed wheels to be cleaned by the apparatus onto the chains 10. A pair of retractable stop pins 26 (only one of which is shown in FIG. 1) are associated with the infeed power driven rollers 24 to prevent entry of a subsequent wheel onto the chains during a cleaning operation. The rollers 24 are driven in rotation by means of a chain and sprocket interconnection (not shown) from the same drive motor 20 which drives the chains 10, hence when chains 10 are stopped, the power driven rollers 24 are also stopped.

A wheel bore cleaning head designated generally 28 is mounted between chains 10 for rotation and for vertical movement relative to frame F. Head 28 is normally maintained in an inactive retracted position shown in FIGS. 1 and 2 in which the head is lowered to a position such that it is clear of the path of movement of wheels along the horizontal upper run R of chains 10.

A centering device includes opposed pairs of rollers 30 (FIGS. 1 and 2 only), mounted above and at opposite sides of chains 10. Rollers 30 are mounted in roller carriers 32 for free rotation about axes which are slightly inclined to the vertical, and are provided with a resilient outer surface. Roller carriers 32 are in turn mounted upon a bridge-like portion 34 of frame F for horizontal sliding movement toward and away from each other from and to a retracted position shown in FIG. 1 wherein the rollers 30 are clear of the path of movement of wheels along the upper run R of the conveyor. A pneumatic motor has its cylinder 36 mounted upon bridge 34 and its piston rod 38 is secured to the one of roller carriers 32. The two roller carriers 32 are linked to each other by a suitable mechanism such as a pinion rotatable on the frame F meshed with a rack on each carrier (not shown), so that the respective pairs of rollers 30 are always equally spaced from opposite sides of a vertical plane midway between chains 10, and move in unison toward and away from each other. The opposed pairs of rollers 30 may be moved inwardly toward each other to engage the upper rim of a wheel on chains 10 to center the wheel with respect to cleaning head 28. The downwardly divergent inclination of the rollers 30 will also wedgingly hold the engaged wheel against upward movement during the cleaning operation.

Details of cleaning head 28 and its associated mechanism are best shown in FIGS. 2–5.

Figure 4:
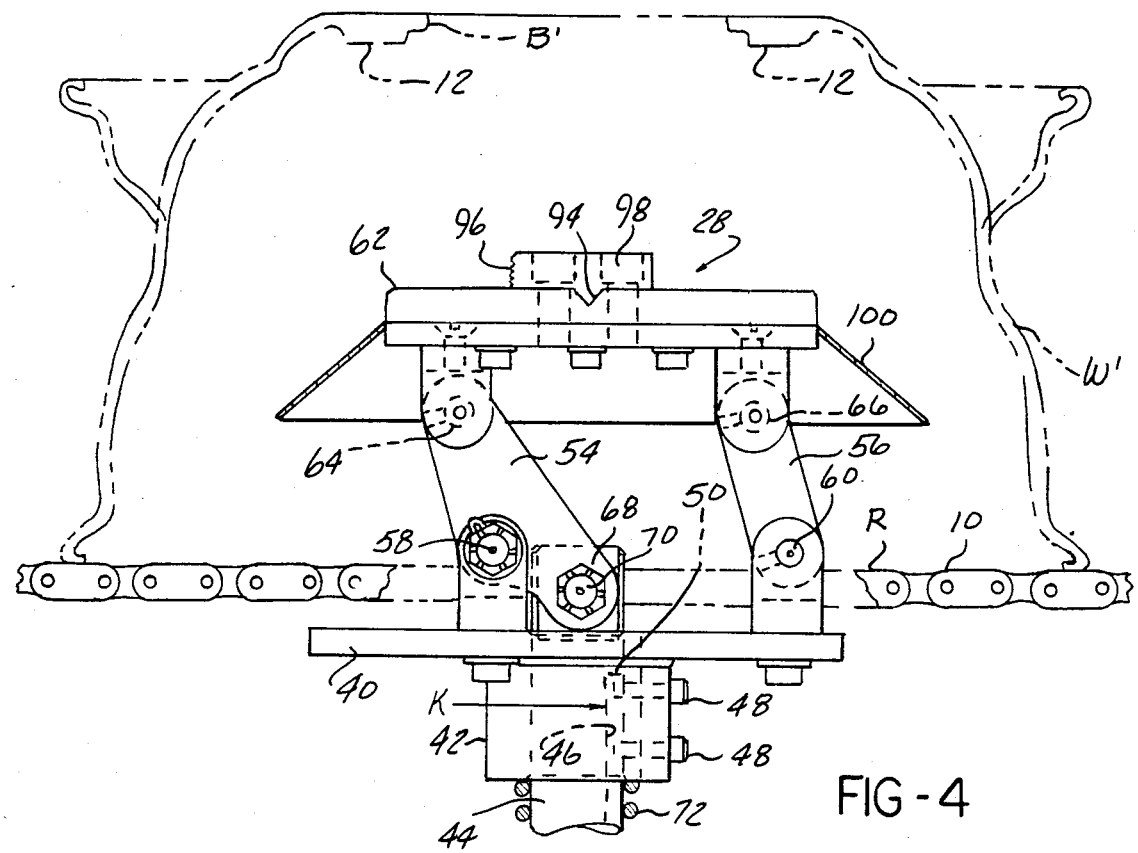
FIG. 4 is a detailed side elevational view, with certain parts omitted, broken away or shown in cross-section, of the wheel cleaning elements and associated mechanism in a first position.
Figure 5:
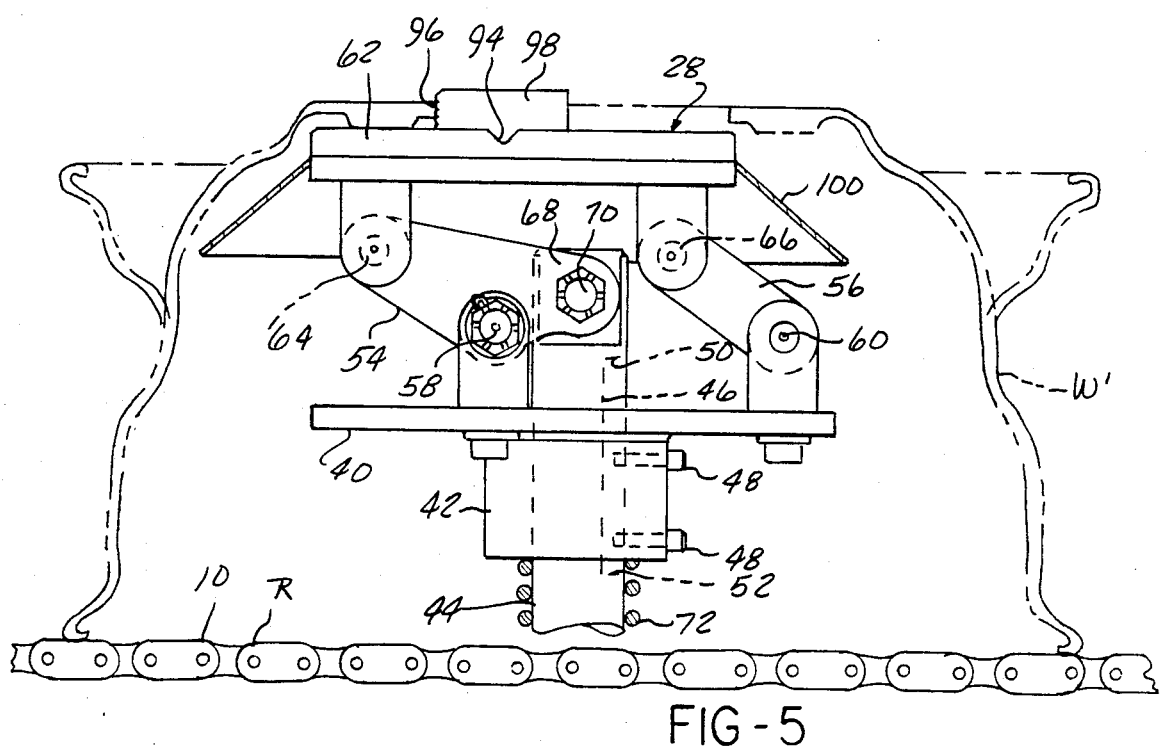
FIG. 5 is a detailed side elevational view similar to FIG. 4, but showing the various parts in a different position.

Referring first to FIGS. 2, 4 and 5, cleaning head 28 includes a rigid horizontal plate 40 fixedly mounted on top of a collar 42 wich is in turn slidably received upon the upper end of a vertically disposed shaft 44. Referring now particularly to FIGS. 4 and 5, shaft 44 is formed with an axially extending slot 46 within which is slidably received key K fixedly secured to collar 42 by bolts 48. Plate 40 and collar 42 are thus coupled to shaft 44 in a rotatively fixed relationship and for axial (vertical) movement relative to the shaft between an upper end limit of movement shown in FIG. 4, at which the key K engages the upper end 50 of slot 46, and a lower end limit of movement established by the lower end 52 (FIG. 5) of slot 46.

A pair of links 54, 56 are mounted upon plate 40 for pivotal movement about parallel horizontal pivot pins 58 and 60 fixedly monted upon plate 40. A rigid circular disc 62 carries on its underside a second set of pivots 64, 66 whose axes are parallel to those of pivots 58 and 60. Pivots 64 and 66 respectively couple the upper ends of links 54 and 56 to plate 62. As best appreciated from a comparison of FIGS. 4 and 5, links 54 and 56 and plate 40, disc 62 are coupled to each other to constitute, geometrically, a parallelogram linkage in which disc 62 may move both horizontally and vertically relative to plate 40. The linkage also tramsmits rotation of plate 40 with shaft 44 to disc 62.

The lower end of link 54 is formed with a crank arm section 68 which is coupled, by a pivot 70, to the upper end of shaft 44. The pivot 70 may be received within a horizontally elongated slot through shaft 44 to provide the necessary play in the pivotal connection as pivot 70 moves along an arcuate path centered at the axis of pivot 58. As is apparent from a comparison of FIGS. 4 an 5, pivotal movement of links 54, 56 relative to plate 40 requires a corresponding vertical movement of plate 40 relative to shaft 44. As best seen in FIG. 2, a compression spring 72 is coiled about shaft 44 to act in compression between the bottom of collar 42 and an upwardly facing shoulder 74 on shaft 44. Plate 40 is thus normally resiliently maintained at its upper end limit of movement relative to shaft 44 shown in FIG. 4 where the top of key K is engaged with the upper end 50 of the slot 46 in shaft 44. This in turn positions the linkage in the position shown in FIG. 4 in which disc 62 is at a maximum vertical spacing from plate 40.

Figure 3:
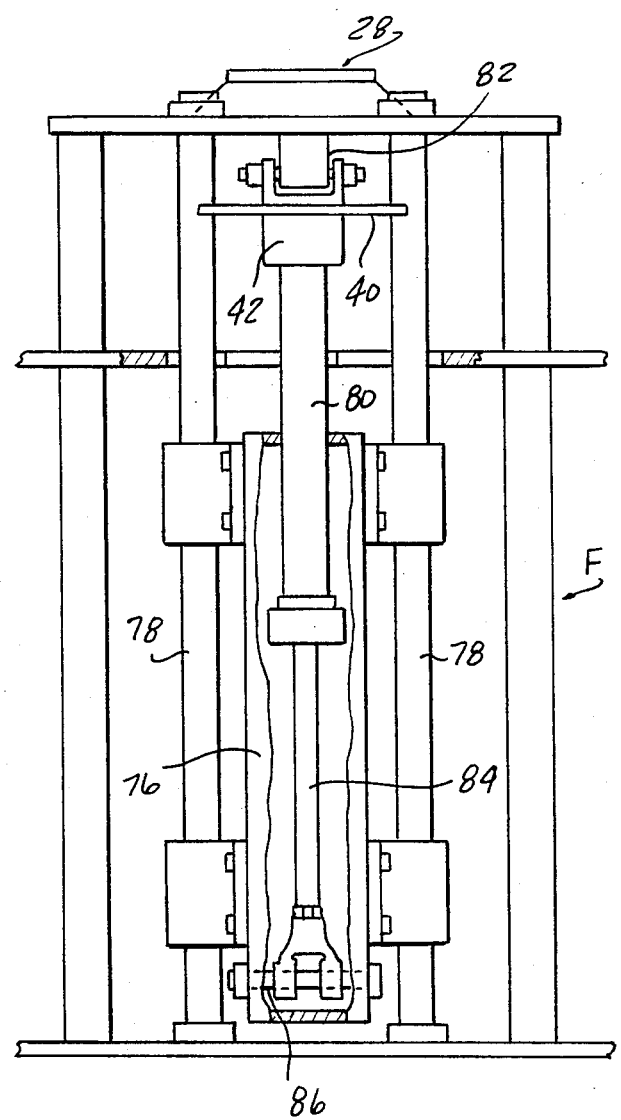
FIG. 3 is a partial end view of the lower portion of the machine of FIG. 1, again with certain parts broken away, omitted, or shown in cross-section.

Referring now particularly to FIGS. 2 and 3, a vertically elongated slide assembly 76 is mounted for vertical sliding movement along a pair of rigid guide rods 78 fixedly mounted in vertical positions in frame F. A reciprocable pneumatic motor including a cylinder 80 coupled at one end to frame F as at 82 (FIG. 3), and a piston rod 84, coupled as at 86 (FIG. 3) to slide assembly 76, is employed to raise and lower slide assembly 76 along guide rods 78.

Referring now particularly to FIG. 2, a rotary air motor 88 is fixedly mounted upon slide assembly 76, for movement with the slide assembly, and its drive shaft is coupled via coupling 90 to shaft 44 which in turn is supported upon slide assembly 76 for rotation as in bearing blocks 92. Shaft 44 is thus mounted for rotation about a vertical axis which is fixed relative to machine frame F and also for movement axially along this vertical axis.

Raising of the cleaner head 28 from its retracted position into contact with a wheel on chains 10 engaged by centering rollers 30, and subsequent rotation of cleaning head 28, is employed to remove from the surfaces of a wheel, which will be engaged by the chuck of a wheel balancing unit, dirt particles, paint lumps, weld splatter, etc. The surfaces of the wheel which must be so cleaned are a radially extending surface on the wheel around the periphery of its central opening which will engage a horizontal platformlike surface on the balancer chuck to support the wheel on the chuck in a horizontal position, and the walls of the central bore opening in the wheel against which radially expandable elements of the balancer chuck will be seated.

The purpose of the cleaning operation is to assure that these last surfaces of the wheel are reasonably smooth and clean, do not have any projecting bumps which might cause misalignment of the wheel in the balancer and do not have any loosely attached particles which might accumulate in the balancer chuck itself. It is not intended in the cleaning operation to cut or machine any metal from the wheel itself and in fact it is desirable that as little paint as possible be removed from the wheel during the cleaning operation.

Cleaning of the radial surface of the wheel in accordance with the foregoing requirements is accomplished by the upper surface of disc 62 which is hardened and formed with a series of radially extending grooves such as 94 (FIGS. 1, 4 and 5). Cleaning of the inner diameter of the central bore opening of the wheel is performed by a knurled surface 96 (FIGS. 1, 4 and 5), formed upon a block 98 fixedly mounted on the top of disc 62. A conical skirt 100 is fixed around the periphery of disc 62 to deflect particles removed by the cleaning operation.

OPERATION

Operation of the machine described above is as follows.

A wheel is fed in a horizontal position onto the power driven rollers 24 and, assuming stop pins 26 are retracted, is passed onto the horizontal upper run R of chains 10. The wheels are fed into the machine of the present application by a suitable infeed conveyor (not shown) and stop pins 26 are controlled so that only one wheel at a time is supported on chains 10.

A wheel released onto chains 10 by retraction of the stop pins 26 will be carried by chains 10 along upper run R until the wheel is approximately positioned over cleaning head 28 which, at this time, is in its retracted position. Arrival of the wheel at the desired position will be detected by a suitable detector, such as a conventional limit switch or photoelectric cell (not shown), which will signal the arrival of the wheel at the desired position to the control system which will then immediately stop further movement of the conveyor chains. The characteristics of the rotary air motor 88 are such that stoppage of the chains occurs almost simultaneously with the shutting off of the air supply to motor 88.

The centering rollers 30 are held in their retracted position until the conveyor is stopped. When the conveyor stops, motor 36, 38 is actuated to pull the opposed pairs of rollers toward each other is to engage opposite sides of the wheel on the conveyor and center the wheel transversely of the conveyor with the wheel axis in alignment with the fixed vertical axis of shaft 44 of the cleaner head assembly 28.

At this time, the slide assembly 76 is at its fully retracted position, shown in FIG. 2, and plate 40 of cleaning head 28 is biased to its upper end limit of movement relative to shaft 44 by spring 72.

It should be noted that the machine is designed to handle wheels of different dimensions and of different cross-sectional configurations fed in random sequence to the machine. Variations in the outside diameter of wheels fed to the machine is accommodated by the centering device whose opposed pairs of rollers 30 are maintained, throughout their range of horizontal movement, in symmetrically spaced relationship at opposite sides of the center line of the conveyor. The supply of air under pressure to cylinder 36 is under the control of a pressure regulator which establishes a maximum pressure which can be applied to the cylinder in drawing the rollers 30 into contact with the opposite sides of the wheel. When the pressure supplied to cylinder 36 reaches the preselected maximum pressure, the rollers 30, regardless of their location, are in firm engagement with the wheel to hold it in its centered position and, as described above, the vertical inclination of the rollers will also hold the engaged wheel firmly down on chains 10.

The diameter of the central opening or bore B of the wheel W may also vary between wheels, as can the axial width of the wheel. The cross-sectional configuration of the wheels may be such that the central opening is within the envelope defined by the opposite rims of the wheel W, as shown in FIG. 2 or, in the case of some large truck wheels, this opening B' may even be outwardly offset from one rim of the wheel. These last variations are accommodated by the combination of the parallel linkage system shown in FIGS. 4 and 5 with a pressure regulator connected in the supply of air to cylinder 80 to control a maximum operating pressure supplied to this cylinder in the same manner described above with respect to cylinder 36.

These last actions are described below with reference to FIGS. 4 and 5 of the drawings.

In FIG. 4, a wheel W' is shown in which the bore B' is offset outwardly beyond one rim of the wheel at a substantial distance above conveyor chains 10.

In FIG. 4, the cleaning head 28 is shown moving upwardly within wheel W' toward the wheel bore B' with plate 40 of the head resiliently maintained by spring 72 at its upper end limit of movement relative to shaft 44. The coupling between crank arm 68 of link 64 and the upper end of shaft 44 constrains the linkage defined by links 54, disc 62 and link 66 to the position shown in FIG. 4 at which disc 62 is at a maximum vertical spacing above plate 40.

In FIG. 4, motor 80, 84 is driving slide assembly 76, and thus shaft 44, upwardly and this upward movement will continue until the upper surface of disc 62 engages the downwardly facing annular surface R of wheel W'.

It will be recalled that the wheel is being held against upward movement relative to chains 10 at this time by the inclined centering rollers 30.

Further upward movement of shaft 44 after disc 62 engages the surface R of the wheel cannot move the disc 62 any further upwardly, and hence the upper end of shaft 44 as it continues to move upwardly must begin to move vertically relative to disc 62 toward the disc. This movement in turn must cause a vertical movement of pivot 70, connecting the crank arm 68 of links 54 to the shaft, relative to pivot 64 and this action in turn will pivot links 54 and 56 from the position shown in FIG. 4 toward that shown in FIG. 5. This causes vertical displacement of shaft 44 upwardly relative to plate 40; this last relative movement being resisted by compression spring 72.

The geometry of the linkage is such that as plate 40 moves upwardly relative to disc 62 and downwardly relative to shaft 44, links 54 and 56 swing in counterclockwise movement about their respective pivots 58 and 60 from the FIG. 4 position toward the FIG. 5 position, thus moving disc 62 to the left as viewed in FIGS. 4 and 5 until the knurled surface 96 on block 98 radially engages the wall of the central bore B' in wheel W' as in FIG. 5. Rotation of shaft 44 will now cause the knurled surface 96 to clean the bore B', and the grooved upper surface of disc 62 to clean the downwardly facing radial surface R of wheel W'.

By regulating the maximum pressure supplied to cylinder 80 of the slide assembly lift motor, the slide assembly will be driven upwardly until both the top surface of disc 62 and the radially facing knurled surface 96 of block 98 are pressed into reasonably firm contact with the respective surfaces B' and R of the wheel. Operation of motor 88, which drives shaft 44, nd hence plate 62, in rotation will normally be for a fixed time interval.

At the conclusion of this timed interval, the air supply connection to cylinder 80 is reversed to lower the slide assembly and disengage disc 62 from the wheel. Upon this disengagement, spring 72 restores the cleaning head to its normal position, shown in FIG. 4. when head 28 reaches its fully retracted position, the centering rollers 30 are restored to their retracted position and motor 20 is started up to drive chains 10 to convey the cleaned wheel clean of the machine and into the inlet of a subsequent work station (not shown). The bore cleaner is then ready for another cycle.

While one embodiment of the invention has been described in detail, it will be apparent to those skilled in the art that the disclosed embodiment may be modified. Therefore, the foregoing description is to be considered exemplary rather than limiting and the true scope of the invention is that defined in the following claims.

I claim:

1. Apparatus for cleaning the central bore and an adjacent radial surface of a vehicle wheel comprising conveyor means for conveying a wheel in a horizontal position to and from a cleaning station, centering means at said cleaning station operable to hold a wheel in coaxial alignment with a fixed vertical axis and to maintain said wheel against vertical movement, a shaft mounted for rotation about said vertical axis and for guided vertical movement along said axis, a horizontal disc, mounting means mounting said disc upon one end of said shaft for rotation with said shaft and for coordinated vertical and horizontal movement relative to said shaft having radially and axially extending cleaning means fixedly mounted thereon at the side of said disc remote from one end of said shaft, first drive means operable to drive said shaft vertically from a rest position wherein said cleaning means are located clear of the path of movement of wheels on said conveying means toward a wheel held by said centering means to project said axially extending cleaning means through the central bore of said wheel, to subsequently engage said radially extending cleaning means with a radially extending surface of said wheel and to subsequently shift said shaft vertically relative to said disc to cause said mounting means to shift said disc horizontally relative to said shaft until said axially extending cleaning surface is engaged with the wall of said central bore, and second drive means for driving said shaft in rotation about said vertical axis.

2. The invention defined in claim 1 wherein said mounting means comprises a horizontal plate rotatively fixed to said shaft and slidable axially along said shaft toward and away from said one end of said shaft, spring means biassing said plate toward said one end of said shaft to a first end limit of vertical movement relative to said shaft, parallel link means pivotally coupled at opposite ends respectively to said plate and to said disc for pivotal movement about parallel horizontal pivot axes, and a crank arm fixed at one end to one of said link means and coupled at its opposite end to pivot said link means upon said plate upon vertical movement of said plate relative to said shaft.

3. The invention defined in claim 2 wherein said shaft is mounted below said conveying means, and means on said centering means for pressing a wheel held thereby downwardly against said conveying means.

4. The invention defined in claim 3 wherein said first drive means comprises a slide member mounted for movement relative to said conveying means along a fixed vertical path, reciprocable fluid pressure operated motor means for driving said slide member in movement in either direction along said vertical path, fluid pressure supply means operatively connected to said motor means, and pressure relief means in said supply means establishing a maximum pressure for fluid supplied to said motor means.

* * * * *

UNITED STATES PATENT AND TRADEMARK OFFICE
CERTIFICATE OF CORRECTION

PATENT NO. :     4,723,335

DATED       :     February 9, 1988

INVENTOR(S) :    John P. Kane

It is certified that error appears in the above-identified patent and that said Letters Patent is hereby corrected as shown below:

Column 3, line 6, delete the first occurrence of "an" and insert --and--.

Column 4, line 3, delete "wich" and insert --which--.

Column 4, line 17, delete "monted" and insert --mounted--.

Column 4, line 35, delete "an" and insert --and--.

Column 5, line 60, delete "is".

Column 7, line 19, delete "nd" and insert --and--.

Column 7, line 29, delete "clean" and insert --clear--.

Signed and Sealed this

Twenty-sixth Day of July, 1988

Attest:

DONALD J. QUIGG

*Attesting Officer*         *Commissioner of Patents and Trademarks*